United States Patent [19]
Jimenez, Jr. et al.

[11] Patent Number: 5,784,827
[45] Date of Patent: Jul. 28, 1998

[54] DEVICE FOR SECURING BAITS TO FISH HOOKS

[76] Inventors: Alfredo Jimenez, Jr., 255 Lake Ridge Dr., Seguin, Tex. 78155; David Leon Bush, 3030 Morning Ridge, San Antonio, Tex. 78247

[21] Appl. No.: 868,165

[22] Filed: Jun. 3, 1997

[51] Int. Cl.$^6$ ............................................. A01K 83/06
[52] U.S. Cl. ................................................. 43/44.8
[58] Field of Search ........................ 43/44.2, 44.4, 43/44.6, 44.8, 42.24

[56] References Cited

U.S. PATENT DOCUMENTS

| | | | |
|---|---|---|---|
| 1,862,187 | 6/1932 | Lageson. | |
| 2,074,540 | 3/1937 | Dorsey. | |
| 2,482,721 | 9/1949 | Sigmundi. | |
| 2,599,684 | 6/1952 | Bakken. | |
| 3,778,920 | 12/1973 | Anton | 43/44.4 |
| 3,863,378 | 2/1975 | Walker | 43/42.37 |
| 3,978,606 | 9/1976 | Riggs | 43/44.8 |
| 4,123,870 | 11/1978 | Wiskirchen | 43/42.37 |
| 4,219,956 | 9/1980 | Hedman | 43/44.8 |
| 4,244,133 | 1/1981 | Martinek | 43/42.37 |
| 4,334,381 | 6/1982 | Carver | 43/44.8 |
| 4,653,212 | 3/1987 | Pixton | 43/42.24 |
| 4,765,086 | 8/1988 | Schultz | 43/42.52 |
| 4,827,657 | 5/1989 | Slehofer | 43/44.2 |
| 4,841,665 | 6/1989 | McGahee | 43/42.24 |
| 5,025,586 | 6/1991 | Pixton | 43/42.39 |
| 5,129,175 | 7/1992 | Pixton | 43/42.24 |
| 5,152,094 | 10/1992 | Strickland | 43/42.39 |
| 5,218,780 | 6/1993 | Jacobson | 43/44.4 |
| 5,274,947 | 1/1994 | Griffiths | 43/44.2 |
| 5,333,407 | 8/1994 | Merritt | 43/44.4 |
| 5,490,345 | 2/1996 | Infinger | 43/42.24 |

*Primary Examiner*—Jack W. Lavinder

[57] ABSTRACT

A device to be used in conjunction with a fishing hook to secure bait to the hook. The device consists of a singular filament formed into a diametrical serpentine configuration with a bend formed in the middle of the device. This bend forms a self-enclosed open loop allowing for universal hook attachment. Opposing open ends of the device allow it to be threaded into and completely enclosed by the leading end of the bait. The opposing open ends further enhance operation of the device by allowing for self-centered attachment of baits to the device. The device adapts to accept many different baits and hook configurations.

11 Claims, 2 Drawing Sheets

5,784,827

1

DEVICE FOR SECURING BAITS TO FISH HOOKS

BACKGROUND—FIELD OF THE INVENTION

The present invention relates to an improved apparatus for securing fish baits to a fish hook.

BACKGROUND—DESCRIPTION OF PRIOR ART

Since the introduction of soft plastic baits to the fishing industry, fishermen have encountered numerous devices to affix baits to hooks. These devices range from mere barbs on hook shanks to compensation springs. Although improvements have been made over the years, there is still a need for an attachment that will not only support baits of various materials and textures, but will allow the user to install and remove baits without excessive damage to the baits. Such an attachment must accommodate numerous bait and hook combinations available on the market today.

Over the years attempts have been made to accomplish this unsuccessfully. Early attempts included barbs cut into the shank of hooks over which the head of a bait was threaded. This method gave little support to a bait and, once used, would render the bait useless in another application because of the likelihood of the barbs to tear out the plastic during removal.

U.S. Pat. No. 4,334,381, issued to Carver improved on this concept by the addition of an auxiliary shaft with barbs to be attached to a hook eye. Although this was an improvement over barbs on the hook shank itself, it still tended to tear plastic baits quickly. It also resulted in a longer shaft that reduced clearance between the apparatus and hook barb, thereby hindering the functioning ability of the hook.

U.S. Pat. No. 3,978,606, issued to Riggs replaced the barbs on the shank of a hook with a helical spring attached to the shank of a hook. Although this was a major improvement over previous attempts, it still had shortcomings in that the helical spring had to be welded or otherwise permanently attached to the hook. It was welded to the shaft of the hook at the side closest to the barb rather than the eye. This rendered it impossible to thread a plastic worm onto the hook and over the helix without tearing it. In an attempt to compensate for the tearing of baits, Riggs required that the helical spring be constructed from resilient material. However, producing a resiliency to match all bait textures is difficult.

U.S. Pat. No. 4,244,133, issued to Martinek, allowed for attaching a swivelling spring coil. This improved the ease of attachment of a lure to the hook, but was nevertheless inadequate in that it still required a spring coil for bait attachment, and the problem of tearing or coring baits was not resolved.

U.S. Pat. No. 4,841,665, issued to McGahee improved on the spring concept by making a hook attachment even more manageable. This device still encompassed the idea of a resilient spring to secure bait. The problem with this concept is that, according to McGahee's own teachings, the spring coil must be fabricated of a material which will provide resiliency to perform the dual role of holding bait as a compression spring, while still being an expansion spring that will expand when a fish strikes. According to these teachings there is a critical balance between elasticity of bait material and spring tension to prevent coring baits. However, what McGahee failed to address is the fact that bait pliability varies widely considering the various textures and materials manufactured and sold in the fishing industry. These inconsistencies make it extremely difficult if not impossible to consistently match spring tensions to baits, thereby frequently coring baits.

Another difficulty with McGahee's device is attachment to the hook. Originally, it was required that one end of the spring be bent with pliers around the hook eye, thereby making it difficult to attach and remove. In an improvement, McGahee provided an alternative method in which a spring clip is snapped over the hook eye. However, this improvement complicates the manufacturing process in that it requires the employment of intricate calculations to match spring rigidity to clip size. McGahee's improved invention also includes a novel feature in the development of a compensation bend in its final coil, preventing the bait from coring itself. However, this feature actually further complicates the manufacture of the invention in that it requires complicated and intricate angular formation within its structure.

In yet another attempt to overcome the problem of damage to baits U.S. Pat. No. 5,490,345, issued to Infinger utilizes a solid screw attachment. In actuality, this attachment provides even less grip for the bait. Upon installation, the screw attachment tends to stretch the bait material to the point that it doesn't grip at all, thus causing it to tear and eliminating its holding quality. The solid screw tends to split apart the bait material thus coring the bait in much the same manner as U.S. Pat. No. 4,841,665; since there is no gap in the device between threads and the screw shaft, it is inevitable that the bait will be cored. It is extremely difficult to initialize the threading, and, according to finger's teaching, the apparatus requires 2-3 rotations to hold the bait. However, once this rotation sequence is completed, the bait is already useless because of the coring effect.

SUMMARY OF THE INVENTION

Existing bait connection devices enhance the probability of tearing or coring of artificial baits due to the cutting action of barbs and the difficulty of matching spring tension to bait material. This tearing or coring results in premature failure of a bait's ability to stay connected to a hook, rendering the bait useless.

In the case of helical coil springs now in use, less coring could be accomplished by increasing the degree of angle of the coils, lengthening the device. However, this would decrease its holding ability and cause it to interfere with the hook point.

With the development of the diametrical serpentine device described herein, the degree of angle is increased as suggested, however there is no lengthening of the device and no holding quality is lost, due to diametrical serpentine construction. Both the angular structure and the fact that there are two diametrical serpentine components enhance, rather than detract from, the holding ability of the device. This angular increase also results in less tension on attached bait, thereby reducing the likelihood of the bait tearing or coring. An additional benefit of the invention is the reduction of the number of manual rotations required to attach a bait to the apparatus. Attaching a bait threaded over a hook shank is less cumbersome and less time consuming than with previous devices.

Since the diametrical serpentine device is manufactured from a single filament, a bend is formed in the middle of the filament. This bend not only supports each serpentine coil but also serves as means to attach the apparatus to hooks of various shapes and styles. No special tools are required to make this connection, resulting in ease of installation and removal of hooks. This form of attachment to hooks further reduces the possibility of tearing baits when threading them over the eye of a hook and onto a line; the apparatus makes a smooth transition around the hook eye without requiring the bait to pass over any sharp termination of wire, as is the case with previous spring clip designs.

Another improvement is that the material used to manufacture the diametrical serpentine need only be rigid enough to retain its shape to perform its function. Shock absorption is provided by the increased angle of the coils in a diametrical configuration, not by the resiliency of a compression and expansion spring force as in previous devices. This solves the problem of having to match spring tension to bait material composition, making the device more versatile.

The diametrical serpentine configuration also eliminates the need for the compensation bend that is required in the McGahee invention. The purpose of the compensation bend was to avoid coring the baits with the shank—without this bend, the bait is forced up against the shank. However the addition of the compensation bend grossly complicated manufacture. The diametrical serpentine device eliminates the need for a compensation bend by centering itself around a hook shank. Since the diameter of the coils are calculated to allow for the hook shank to pass through the coils without engaging them, the resulting self-centering aspect is evident in that the two points of entry into the bait prevent the bait from forcing the device into the hook shank, thereby eliminating the need for a compensation bend.

As is apparent in the above discussion, the diametrical serpentine coils are a key feature of this device. These diametrically opposed coils solve three major flaws of precious devices:

1. The increased angles of the coils in the diametrical serpentine device serve as shock absorption, eliminating the need to calculate spring tension.
2. The diametrical serpentine device reduces the number of rotations required to attach baits.
3. The diametrical open ends of coils serve to self-center a bait when used coaxially on a hook shank, thus preventing the device from forcing itself against the hook shank and coring the bait. This results in eliminating the need for a compensation bend required in the manufacture of previous devices.

OBJECTIVES OF THE INVENTION

It is an object of the present invention to provide a bait securing device in the form of diametrical coils in a serpentine configuration.

It is an object of the present invention to provide a bait securing device that causes less coring and tearing of baits, thereby making it less expensive to use baits.

It is an object of the present invention to provide a bait securing device with a diameter calculated to allow for a hook shank to pass coaxially through the coils.

It is an object of the present invention to provide a means of securing many types of baits of different material consistencies, elasticities, pliabilities, etc. without regard to spring rigidity.

It is an object of the present invention to provide an improved means of attaching the device to a hook, requiring no special tools or calculations as to clip size and spring tension.

It is an object of the present invention to provide a bait securing device that is less cumbersome and requires minimal rotational effort to attach a bait.

It is an object of the present invention to provide a bait securing device that allows for shock absorption by use of diametrically opposed serpentine coils instead of an expansion spring.

It is an object of the present invention to provide a bait securing device which allows someone to thread a bait wherein the hook eye is embedded into the bait without coming into contact with any protruding elements of the device where it attaches at the hook eye, preventing further tearing of plastic baits.

It is an object of the present invention to provide a bait securing device that is self centering when used coaxially over the shank of a hook, resulting in less frequent coring of baits.

It is an object of the present invention to provide a bait securing device that can be attached to hooks in many different applications.

It is an object of the present invention to provide a bait securing device that is compatible with many styles of hooks and baits.

It is an object of the present invention to provide a bait securing device that is easier to manufacture.

Figure 1:
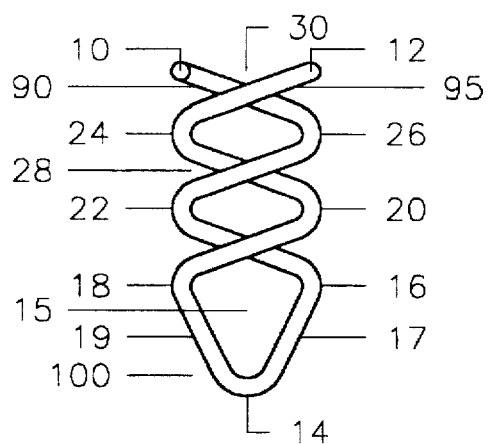
FIG. 1 is a side view of the diametrical serpentine device of the invention.

LIST OF REFERENCE NUMERALS 10. open second end of first coil
12. open second end of second coil
14. bend
15. open loop
16. first end of first coil
17. transitional filament
18. first end of second coil
19. opposing transitional filament
20. middle of diametrical coil
22. middle of the coil
24. last bend of diametrical coil
26. last bend of coil
28. space between diametrical coils
30. inside diameter of the coils
40. bait
41. point of hook
42. hook
43. hook shank
44. straight shank hook
45. hook bend -continued 46. fishing line
48. eye
50. jig head
60. head
90. first coil
95. second coil
100. device

DETAILED DESCRIPTION OF THE INVENTION—FIGS. 1 to 8B

As is required, detailed descriptions of the invention are revealed herein; however, it is to be understood that the revealed descriptions are merely exemplary of the invention which may be embodied in various forms. Therefore, specific structural and functional details disclosed herein are not to be interpreted as limited, but merely as a basis for teaching one skilled in the art to diversely utilize the invention in essentially any appropriately detailed structure.

Reference is now made to numbered figures, wherein like characteristics and features of the invention shown in the various figures are designated by the same reference numerals.

FIG. 1 illustrates a side view of the diametrical serpentine device 100. The device 100 is constructed of a filament rigid enough to retain its shape after forming. Device 100 is constructed with a bend 14 formed in a section of the filament. Transitional filament 17 and opposing transitional filament 19 continue to connect first coil 90 and second coil 95 to bend 14. The contours of transitional filaments (17 and 19) are unimportant to their function as long as coils (90 and 95) are retained in their diametrical configuration. The open loop 15 created by this configuration is used to retain the device 100 on a hook. The first end of first coil 16 starts the first coil 90 and the first end of second coil 18 starts the second coil 95. Formed serpentine coils 90 and 95 are diametrical. Each serpentine coil (90 and 95) has a bend (e.g. 20, 22, 24, and 26) with an angle of 10°–70° to allow for shock absorption between bait (not shown) and device 100. The degree of angle creates a space 28, allowing coils (90 and 95) to continue its path without engaging one another. The middle of the coil 22 and the middle of diametric coil 20 is one half rotation. The last bend of coil 26 and the last bend of diametric coil 24 form one full rotation. The filament continues its serpentine path until open second end of first coil 10 and opposing open second end of second coil 12. Open second ends (10 and 12) allow bait (not shown) to be threaded over the device 100 and rotated up at least one turn to secure the bait (not shown). The inside diameter of the coils 30 is calculated to allow a hook shank to pass through the first and second coils (90 and 95) without engaging them.

Figure 2:
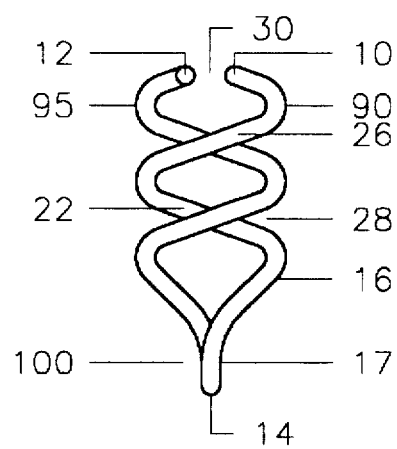
FIG. 2 is a front view of the diametrical serpentine device.

FIG. 2 illustrates a front view of the diametrical serpentine device 100. This view shows the transitional filament 17 that connects bend 14 and the first end of first coil 16. The middle of the coil 22 constitutes one half rotation from the point that the transitional filament 17 joins the first end of first coil 16, and the last bend of coil 26 is one full rotation from the point that transitional filament 17 joins the first end of first coil 16. The serpentine coils (90 and 95) continue until the open second end of first coil 10 and opposing open second end of second coil 12. The open second ends (10 and 12) provide a means for self centering attachment of bait (not shown).

Figure 3:
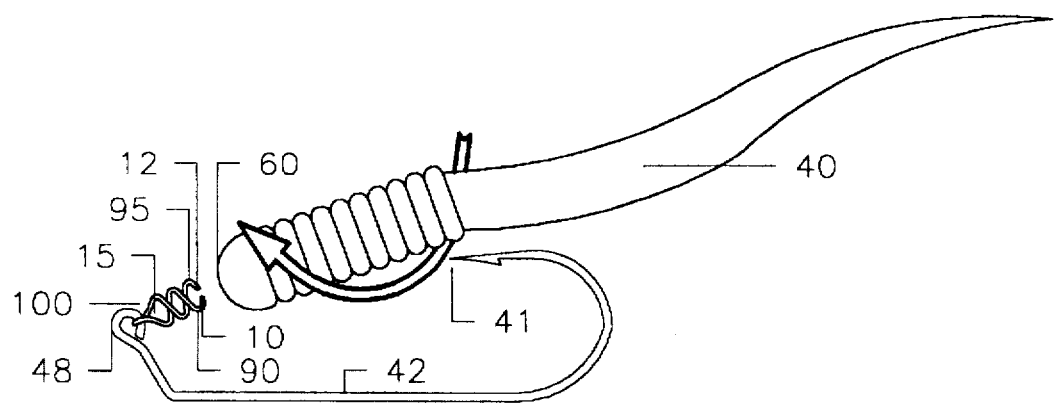
FIG. 3 illustrates the diametrical serpentine device attached to a hook eye and not encompassing a hook shank.

FIG. 3 illustrates the diametrical serpentine device 100 attached in a swivelling fashion to eye 48 of hook 42 which is a 60° bent jig hook of any manufacture. Other angles of hook bend may also be used. This illustration shows the relationship of bait 40 to the device 100 as the head 60 of bait 40 is threaded onto open second ends (10 and 12) of coils (90 and 95) encompassing the device 100. The point of hook 41 is to be buried back into the bait 40, forming a weedless hook-worm combination.

Figure 4:
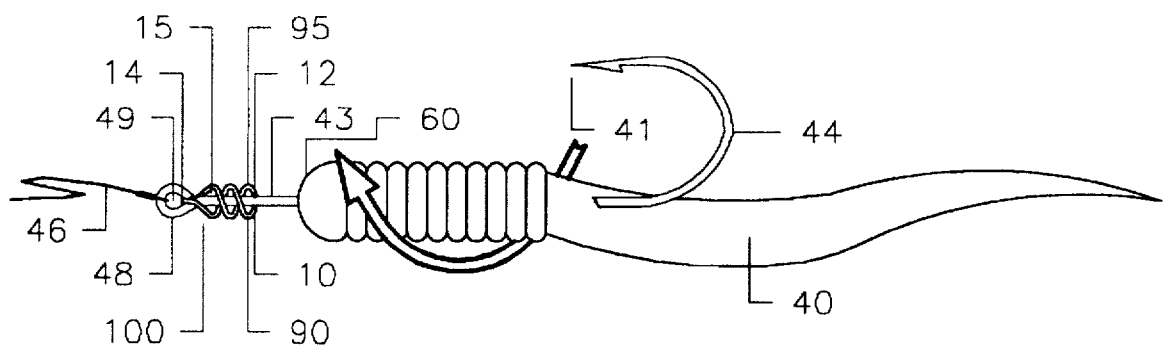
FIG. 4 illustrates the device attached to the eye of the hook, coaxially encompassing the hook shank.

FIG. 4 shows the device 100 installed coaxially over straight shank hook 44 of any manufacture. The open loop 15 of the device 100 is shown threaded into eye 48 of hook 44. The coils (90 and 95) encircle hook shank 43 without engaging hook shank 43. The bend 14 of the open loop 15 rests against the inside of hook eye 49 securing it on hook 44. The open second ends (10 and 12) of coils (90 and 95) keep the bait 40 centered around hook shank 43 when threading bait 40 onto the device 100.

Figure 5:
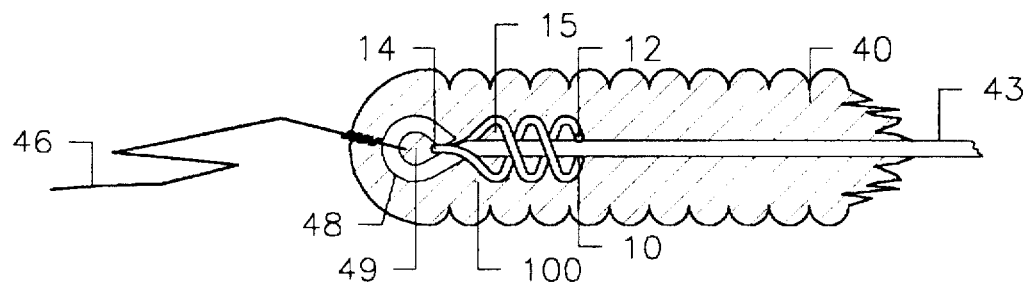
FIG. 5 is a cut-away view illustrating a bait emplaced over the diametrical serpentine device and a hook eye onto a line.

FIG. 5 shows a cut-away view of the diametrical serpentine device 100 attached coaxially over hook shank 43 and emplaced in bait 40. The bend 14 of the open loop 15 rests against the inside of hook eye 49 securing device 100 to hook eye 48. This view shows bait 40 threaded completely over and enclosing both the device 100 and hook eye 48. The fishing line 46 is shown attached to hook eye 48. The open second ends (10 and 12) of device 100 are the only sharp ends that bait 40 has to pass over to be threaded over hook eye 48 and onto line 46.

Figure 6:
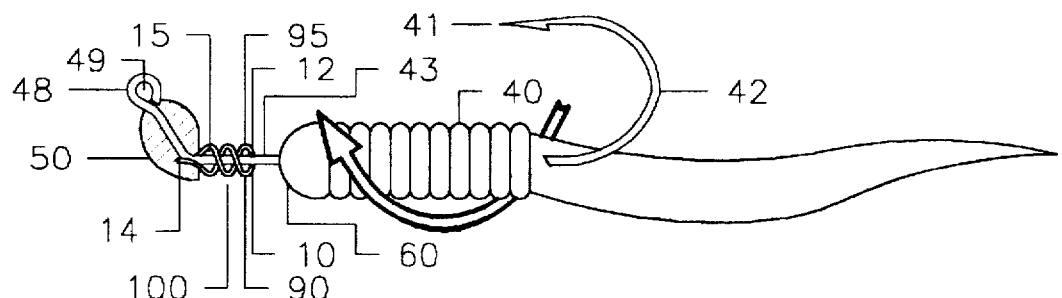
FIG. 6 illustrates a cut-away view of the diametrical serpentine device permanently attached to a hook.

FIG. 6 illustrates the diametrical serpentine device 100 used in a permanently affixed configuration, e.g., a lead jig head 50. The hook 42 illustrated is a 60° bent shank hook of any manufacture. The illustration portrays a cut-away view of jig head 50, showing bend 14 and open loop 15 of device 100 embedded into materials used to form jig head 50 forming a permanent attachment. Of course, jig head 50 may be formed from any material suitable for permanent attachment of device 100 to hook 42. The shape of jig head 50 is unimportant to proper function of device 100. Coils (90 and 95) of device 100 are not embedded in the materials used to form jig head 50 to allow bait 40 to be threaded onto point of hook 41 and up hook shank 43. Head 60 of bait 40 is threaded onto open second ends (10 and 12) continuing until coils (90 and 95) are completely encompassed within bait 40.

Figure 7:
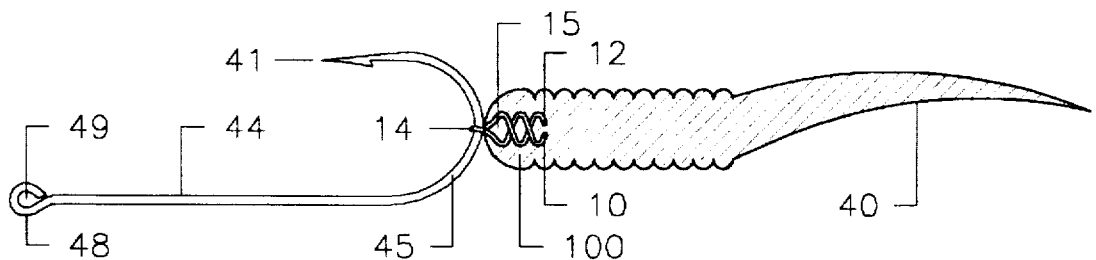
FIG. 7 is a cut-away view in which the diametrical serpentine device is attached to a hook bend with the bait attached as a trailer.

FIG. 7 illustrates a cut-away view of the diametrical serpentine device 100 attached to hook bend 45 with bait 40 threaded onto device 100 to be used as a trailer type bait to hook 44. Bend 14 formed in the middle of device 100 and subsequent open loop 15 provide attachment to hook bend 45.

Figure 8A:
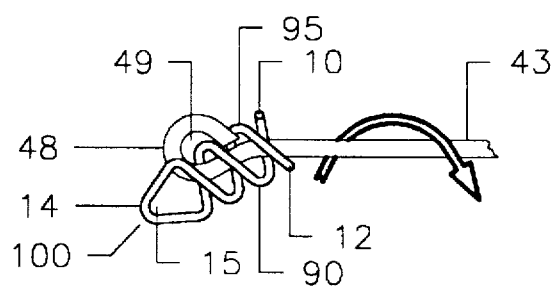
FIG. 8A illustrates the diametrical serpentine device threaded through a hook eye and rotated around the shank of the hook.

FIG. 8A illustrates the method used to attach the diametrical serpentine device 100 coaxially around hook shank 43. While threading open second end of first coil 10 through eye 48 and then around hook shank 43, open second end of second coil 12 also rotates around hook shank 43. Rotation of the device 100 continues until open loop 15 of device 100 engages inside of hook eye 49, completing the attachment process.

Figure 8B:
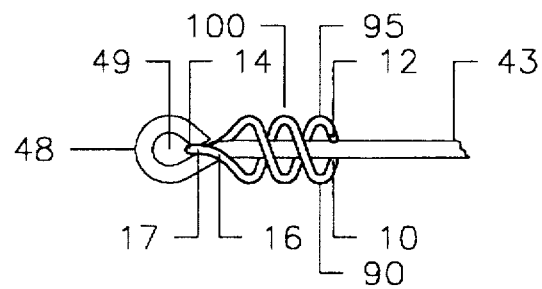
FIG. 8B illustrates the diametrical serpentine device attached through the hook eye and around the hook shank.

FIG. 8B shows the diametrical serpentine device 100 installed coaxially over hook shank 43 and engaged into hook eye 48. The device 100 is constructed of a filament with a diameter so dimensioned as to allow filament to pass through hook eye 48. Bend 14 rests against inside of hook eye 49. Transitional filament 17 runs along hook shank 43 until joining first end of first coil 16. The first coil 90 continues around hook shank 43 without engaging hook shank 43, until terminating at open second end of first coil 10. The opposing transitional filament 19 (not seen this view, refer to FIG. 1) runs along opposite side of hook shank 43 until joining first end of second coil 18 (not seen this view, refer to FIG. 1). Second coil 95 diametrically continues around hook shank until termination at open second end of second coil 12.

What we claim is:

1. A device for securing a bait to a hook comprising: a filament formed in a serpentine configuration, said configuration having a first coil and a second coil, said coils having a first end and an open second end, said coils connected at said first ends and are diametrically opposed; and a self centering attachment for said baits consisting of the said open second ends of said coils; and a hook attachment consisting of the connection of said first ends of said coils.

2. A device of claim 1, wherein the connection of said first ends of said coils form an open loop comprised of a section of said filament, said section of said filament having a bend forming a transitional filament and an opposing transitional filament, said transitional filaments connecting said first ends of said coils, positioning said coils in a diametrical configuration.

3. A device of claim 1, wherein said filament used to form said device has a diameter, said diameter so dimensioned as to allow said filament to pass through eye of said hook.

4. A device of claim 1, wherein said filament be rigid enough to retain shape after forming.

5. A device of claim 1, wherein said coils of said device are spaced, said space larger than diameter of the forming wire of said hook.

6. A device of claim 1, wherein said coils of said device have an inner diameter, said inner diameter so dimensioned as to allow said coils to encircle shank of said hook without engaging said shank.

7. A device of claim 1, wherein said transitional filaments of said open loop have a contour such as to retain said coils of said device in predetermined diametrical configuration.

8. A device of claim 1, wherein said open loop of said device forms detachable connection of said device to said hook.

9. The device of claim 1, wherein said device is permanently attached to said hook by anchoring said open loop of said device to said hook by means of a material, said material being any suitable to form a permanent attachment, said coils of said device not encased in said material allowing for affixment of said bait to said coils.

10. The device of claim 1, wherein said hook attachment is permanent, said permanent attachment formed by anchoring said open loop of said device to said hook by means of a material, said material being any suitable to form a permanent attachment.

11. A device for securing a bait to a hook comprising: a filament formed in a serpentine configuration, said configuration having a first coil and a second coil, said coils having a first end and an open second end; and a self centering attachment for said baits consisting of the said open second ends of said coils; and a hook attachment consisting of the connection of said first ends of said coils, said connection consisting of an open loop comprised of a section of said filament, said section of said filament having a bend forming a transitional filament and an opposing transitional filament, said transitional filaments connecting said first ends of said coils, positioning said coils in a diametrical configuration.

* * * * *